Patented July 31, 1934

UNITED STATES PATENT OFFICE 1,968,052

LOW THERMAL CONDUCTIVITY BUILDING UNIT AND METHOD OF MAKING THE SAME

Charles L. Norton, Boston, Mass., and Robert Richardson and William S. Bateman, Jr., East Liverpool, Ohio, assignors to The Babcock & Wilcox Company, Bayonne, N. J., a corporaton of New Jersey No Drawing. Application May 6, 1931, Serial No. 535,558. Renewed October 14, 1933

12 Claims. (Cl. 25—156)

This invention has reference to a building block and the method of manufacturing the same.

More particularly it has for one object the provision of a method of making a porous refractory building block of the character set forth in the co-pending application of Charles L. Norton, Serial No. 338,567, filed in the United States Patent Office February 8, 1929.

In producing brick of low thermal conductivity with high refractory characteristics it has been found that minute voids widely distributed are preferable to large voids and, according to the application for patent above identified, the production of these voids is accomplished in two ways, first by aerating a liquid mixture of refractory and organic particles and, secondly by eliminating the organic particles whereby voids are created in addition to those formed by aeration.

After the liquid mixture is aerated, the formation of the raw block, or the so-called molding operation must be accomplished with a minimum destructive effect upon the voids caused by aeration, likewise the mixture must be deliquidized while preserving the maximum aerated condition and, in order to produce satisfactory results, from the manufacturing standpoint, these two operations must be accomplished quickly; the present invention therefore includes a method whereby deliquidizing and molding are coincidentally performed.

In addition to the foregoing, the aerated mixture must be of such character that it is readily manipulated in the steps hereinbefore mentioned and, to that end, the present invention contemplates an article formed of a particular mix handled in the method prescribed for producing a highly refractory block with a maximum porosity, and consequent low thermal conductivity, considering its load carrying ability.

In order to satisfactorily carry out the present invention to the point of producing a commercial article, the mix is only satisfactory when it has a large percentage of liquid to form bubbles during aeration, and yet this mixture must be, when aerated, of such consistency that it is not self-draining as otherwise the aeration would disappear during the molding and deliquidizing operation.

We have found that one of such mixtures having the physical characteristics desirable for carrying our invention into practice will include the following ingredients in the percentages indicated (such percentages being by weight) and treated in the manner set forth, to wit:—

Earthy material such as kaolin 35% to 45% pulverized to pass at least 20 mesh or finer; wood flour 35% to 45% pulverized to pass 60 to 70 mesh or finer; earthy material such as kaolin calcined at 2800° F. pulverized to pass 28 mesh or finer 15% to 25%, a water insoluble flux pulverized to pass 200 mesh 4%, and dextrine 1%, are all dry agitated until an intimate mixture is obtained, whereupon water is added to the amount of 150% by weight of dry materials. The resultant mass is then violently agitated until sufficient aeration has taken place to increase the original volume 25% to 50%, whereupon the liquid mixture will be found ready for molding and not self-draining.

This material is then placed in pervious or other suitable molds which are so swung as to utilize centrifugal action for coincidentally conforming the mass to the mold and for extracting the moisture from the mix without sensible deaeration, thus after swinging a certain length of time there is left a formed raw block shape having a maximum dispersion of minute cells created by aeration, and also a wide dispersion of wood flour particles which, by elimination as hereinafter set forth, create minute cells comparable in magnitude, dispersion and number to the cells created by aeration.

The raw block shapes are then removed from the molds and the remaining water may be further extracted by drying or otherwise, if necessary, the cellular structure at this time being tenacious enough so that drying by heat does not materially decrease the bubble structure but rather tends to set it, and by reason of the previous de-watering of the brick shape by centrifugal action rather than by vacuum or other elimination, the brick shape will be found to have the same amount of water in every cross section thereof which thus preserves uniformity of treatment in the subsequent steps about to be described.

The raw block shapes are gradually raised to a temperature of 1800° F. in a reducing atmosphere so that the wood flour, constituting a large percentage of the block, does not burn but becomes charcoal and has nearly the same volume as the original wood flour, thereby continuing to support the fine membranes which divide the voids already created and those about to be created. At this period the block is raised to a higher temperature and the atmosphere changed to oxidizing, and combustion of the charcoal takes place, the temperature rising all the time up to over 2800° F., but always below the fusion point of the refractory particles, combustion of the widely distributed charcoal assisting in uniformly burning the brick and, at the same time the elimination of these particles of charcoal leaves minute gas cells practically as numerous and widely dispersed as those cells created by aeration so that two groups of minute cells or voids exist in the finished block, namely those due to aeration and those due to elimination of the wood flour particles, and the result is a block highly refractory, of compartively great load carrying capacity, stable in character and with a porosity in excess of 70% by volume and in which all voids are minute, thus affording more membrane or web structure to tie the block together than is the case with blocks having both large and small voids.

We claim:

1. The method of manufacturing a building block, which includes the steps of mixing permanent solids with wetting liquids, then coincidentally molding and deliquidizing by centrifugal force, and then permanently setting the block.

2. The method of manufacturing a building block, which includes the steps of mixing powdered permanent solids and wetting liquids, then coincidentally molding and deliquidizing by centrifugal force, and then permanently setting the block.

3. The method of manufacturing a porous building block, which includes the steps of mixing powdered permanent solids and wetting liquids, aerating the mixture, then coincidentally molding and deliquidizing the mixture by centrifugal force, and then permanently setting the block.

4. The method of manufacturing a porous body, which includes the steps of mixing powdered refractory and organic solids with a liquid, aerating the mixture to provide minute voids in the finished block, then coincidentally molding and deliquidizing the mixture by centrifugal force and burning at a temperature imparting the requisite refractory degree and which also eliminates the organic particles, leaving minute voids in addition to those created by aeration.

5. An article of manufacture comprising a building block molded of an aerated liquid mixture of refractory and organic particles subsequently centrifugally deliquidized without deaeration and burned at a final temperature determining its refractory characteristics and during which the organic particles are eliminated leaving minute voids in addition to those created by aeration.

6. An article of manufacture comprising a building block molded of an aerated liquid mixture of refractory and organic particles subsequently centrifugally deliquidized without deaeration and burned at a final temperature determining its refractory characteristics, and during which the organic particles are eliminated, leaving minute voids in addition to those created by aeration, thereby producing a highly porous refractory heat insulating block having a minimum volume change when reheated.

7. An article of manufacture comprising a building block molded of an aerated liquid mixture of refractory and organic particles subsequently centrifugally deliquidized without deaeration and burned at a final temperature determining its refractory characteristics, and during which the organic particles are eliminated leaving minute voids at least comparable in magnitude, number and dispersion to the voids created by aeration.

8. An article of manufacture comprising a building block molded of an aerated liquid mixture of finely ground clay and combustible organic particles subsequently centrifugally deliquidized without deaeration and burned at a final temperature determining its refractory characteristics, and during which the organic particles are eliminated leaving minute voids at least comparable in magnitude, number and dispersion to the voids created by aeration.

9. The method of manufacturing a body having refractory and heat insulating characteristics, and which includes the steps of forming and molding an intimate highly aerated liquid mixture of refractory and combustible organic particles, then centrifugally deliquidizing the mixture while preserving its aerated condition, and then burning the block to establish its refractory characteristics and eliminate the organic particles thereby creating minute voids in addition to those created by aeration.

10. The method of manufacturing a body having refractory and heat insulating characteristics, and which includes the steps of forming and molding an intimate highly aerated liquid mixture of refractory and combustible organic particles, then centrifugally deliquidizing the mixture while preserving its aerated condition, burning the block in a reducing atmosphere to carbonize the organic particles, and then burning the block in an oxidizing atmosphere to establish its refractory characteristics and eliminate the carbonized organic particles thereby creating minute voids in addition to those created by aeration.

11. The method of manufacturing a body having refractory and heat insulating characteristics, and which includes the steps of forming and molding an intimate highly aerated liquid mixture of refractory and combustible organic particles sized in the order of magnitude of the aerating bubbles, then centrifugally deliquidizing the mixture while preserving its aerated condition, and then burning the block to establish its refractory characteristics and eliminate the organic particles, thereby creating minute voids at least comparable in magnitude, number and dispersion to the voids created by aeration.

12. The method of manufacturing a body having refractory and heat insulating characteristics, and which includes the steps of forming and molding an intimate highly aerated liquid mixture of minute refractory particles, a portion of which has been pre-burned, and combustible organic particles all sized in order of magnitude of the aerating bubbles, then centrifugally deliquidizing the mixture while preserving its aerated condition, and then burning the block at a final temperature determining its refractory characteristics, and during which the organic particles are eliminated leaving minute voids comparable in magnitude, number and dispersion to the voids created by aeration.

CHARLES L. NORTON.
ROBERT RICHARDSON.
WILLIAM S. BATEMAN, Jr.